(12) United States Patent
Dobbins

(10) Patent No.: US 9,081,161 B2
(45) Date of Patent: Jul. 14, 2015

(54) ALL-DIELECTRIC SELF-SUPPORTING (ADSS) FIBER OPTIC CABLE WITH A SEMI-CONDUCTING CO-EXTRUDED TRACKING RESISTANT JACKET

(75) Inventor: Patrick E. Dobbins, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 89 days.

(21) Appl. No.: 13/522,281

(22) PCT Filed: Jan. 31, 2012

(86) PCT No.: PCT/US2012/023227
§ 371 (c)(1), (2), (4) Date: Jul. 13, 2012

(87) PCT Pub. No.: WO2012/106284
PCT Pub. Date: Aug. 9, 2012

(65) Prior Publication Data
US 2012/0301091 A1    Nov. 29, 2012

Related U.S. Application Data

(60) Provisional application No. 61/437,767, filed on Jan. 31, 2011.

(51) Int. Cl.
G02B 6/44 (2006.01)
(52) U.S. Cl.
CPC .......................................... G02B 6/44 (2013.01)

(58) Field of Classification Search
CPC .................................... G02B 6/00; G02B 6/44
USPC .......................................... 385/100–110, 147
See application file for complete search history.

(56) References Cited

U.S. PATENT DOCUMENTS

| 3,781,458 | A | * | 12/1973 | May | 174/84 C |
| 4,641,110 | A | * | 2/1987 | Smith | 333/12 |
| 5,563,976 | A |   | 10/1996 | Rowland | |
| 5,606,636 | A | * | 2/1997 | Rowland et al. | 385/101 |
| 6,519,396 | B2 | * | 2/2003 | Schneider et al. | 385/101 |
| 8,463,096 | B2 | * | 6/2013 | Weimann et al. | 385/112 |
| 2004/0197057 | A1 |   | 10/2004 | Lee et al. | |
| 2006/0159408 | A1 | * | 7/2006 | Kim et al. | 385/109 |
| 2009/0285537 | A1 | * | 11/2009 | Willemsen et al. | 385/100 |
| 2013/0051743 | A1 | * | 2/2013 | Gimblet et al. | 385/102 |
| 2013/0077922 | A1 | * | 3/2013 | Weimann et al. | 385/100 |
| 2013/0183013 | A1 | * | 7/2013 | Martin Regalado et al. | 385/104 |

FOREIGN PATENT DOCUMENTS

KR    2001/036083 A  *  5/2001

OTHER PUBLICATIONS

International Search Report for PCT/US2012/023227, dated Jun. 1, 2012.

* cited by examiner

*Primary Examiner* — Akm Enayet Ullah
(74) *Attorney, Agent, or Firm* — Sughrue Mion, PLLC

(57) ABSTRACT

A cable including an inner cable, an outer jacket surrounding the inner cable, and at least one semi-conducting tracking resistant material strip provided in the outer jacket.

13 Claims, 4 Drawing Sheets

ADSS Voltage Potential Relative to Structure

Induced Voltage Potential [kV] & Electric Field Intensity [kV/cm] Distribution Along ADSS Cable From Earthed Deadend

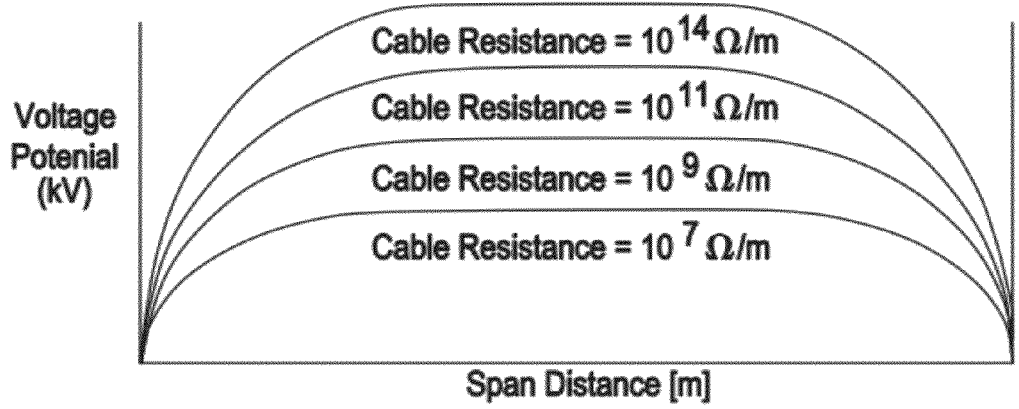

FIG. 3
Voltage Potential Relative to ADSS Cable Resistance

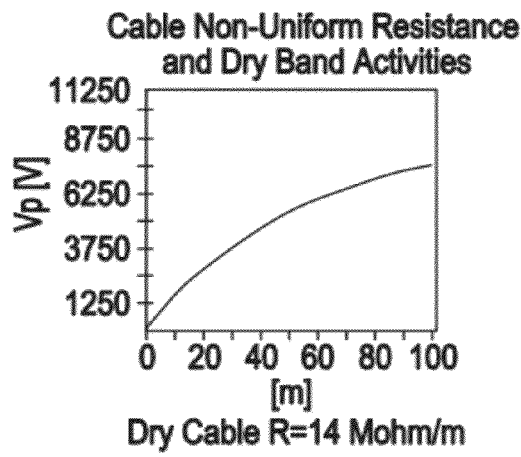

FIG. 4A
Cable Non-Uniform Resistance and Dry Band Activities
Dry Cable R=14 Mohm/m

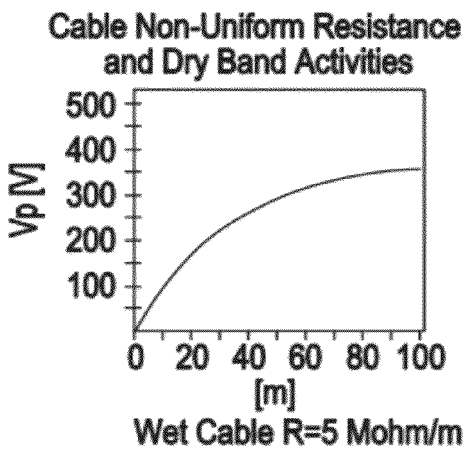

FIG. 4B
Cable Non-Uniform Resistance and Dry Band Activities
Wet Cable R=5 Mohm/m

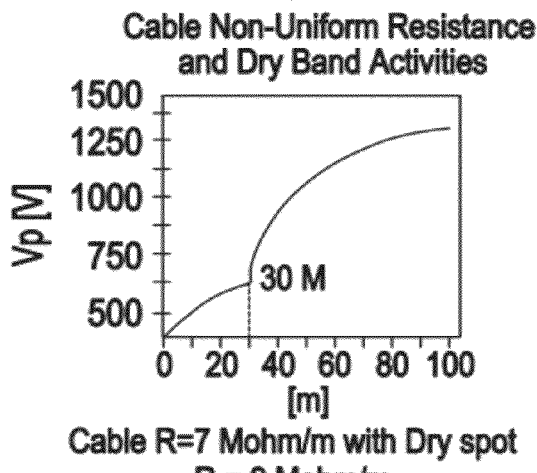

FIG. 4C
Cable Non-Uniform Resistance and Dry Band Activities
Cable R=7 Mohm/m with Dry spot R = 9 Mohm/m

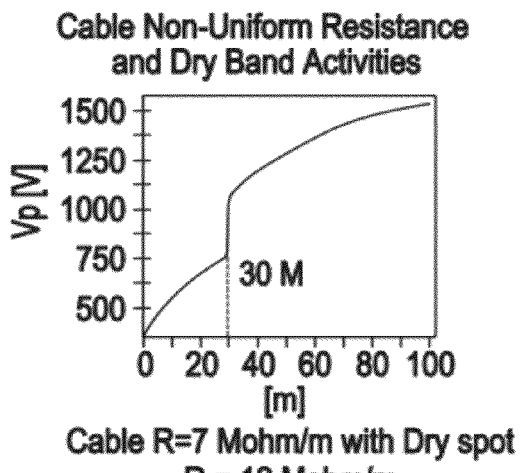

FIG. 4D
Cable Non-Uniform Resistance and Dry Band Activities
Cable R=7 Mohm/m with Dry spot R = 12 Mohm/m ADSS Cable Tracking Mechanism Wet ADSS Cable ADSS Cable Tracking Mechanism Semi-Wet ADSS Cable ADSS Cable Tracking Mechanism Dry ADSS Cable All-Dielectric Self-Supporting
Fiber Optic Cable Cross-Section

ALL-DIELECTRIC SELF-SUPPORTING (ADSS) FIBER OPTIC CABLE WITH A SEMI-CONDUCTING CO-EXTRUDED TRACKING RESISTANT JACKET

CROSS-REFERENCE TO RELATED APPLICATIONS

This application is based upon and claims the benefit of priority from U.S. Provisional Application No. 61/437,767, filed Jan. 31, 2011 in the United States Patent and Trademark Office, the disclosure of which is incorporated herein in its entirety by reference.

BACKGROUND

1. Field

The invention is related to an all-dielectric, self-supporting (ADSS) fiber optic cable that mitigates the deterioration of the outer protective jacket by the dry-band arc or tracking mechanism. More particularly, the cable has a semi-conductive material that provides tracking resistance for the cable in the outer jacket.

2. Related Art

All-dielectric, self-supporting (ADSS) fiber optic cables have been used on power utility, high voltage rights-of-way for many years. The dielectric nature of the cable is ideal for safe installation on power transmission facilities above 69 kV line voltages. By their nature, the dielectric properties of the ADSS cables pose problems with a degradation of the outer protective jacket due surface arcs known as "Tracking" or "Dry Band Arcing." This is caused by the capacitive charge from the power phase conductors to the ADSS cable and changes to the dielectric properties of the outer protective jacket due to surface contaminates and wetting/drying cycles of the cable surface during participation. When the cable is contaminated and has non-uniform resistivity due to wet and dry areas a "scintillation" or "arc" creates a thermal and mechanical erosion of the jacket material that potentially can damage the jacket material, expose the cable's strength members to degradation, and cause subsequent failure of the cable's ability to support the cable's mass and any additional wind and ice loads.

Existing technology to mitigate the deterioration of the outer protective jacket by the dry-band arc or tracking mechanism was directed to computer modeling of the electrical potential coupled to the ADSS from the phase conductors and setting maximum thresholds for different jacket materials based on the environment and different jacket materials with higher resistance to the deterioration caused by tracking. The special jackets would have properties of lower dielectric properties and be cross-linked with proprietary compounds that provided a higher resistance to thermal and mechanical stresses caused by the tracking mechanism. These proprietary jackets are very expensive and difficult to manufacturer. Many papers have been published since the mid 1980's describing the electrical stress mechanisms and the requirements of different jacket materials. See for example:

S. M. Rowland, Prevention of Dry-Band Arc Damage on ADSS Cables, IEEE Transactions on Dielectrics and Electrical Insulation, Vol. 13, No. 4; August 2006, pp. 765-772;

R. Sarathi, S. Chandrasekar, V. Sabari Giri, C. Venkataseshaiah and R. Velmurugan, Analysis of surface degradation of high density polyethylene (HDPE) insulation material due to tracking, Bull. Mater. Sci., Vol. 27, No. 3, June 2004, pp. 251-262;

Qi Huang, George G. Karady, Baozhuang Shi, and Monty Tuominen, Study on Development of Dry Band on ADSS Fiber Optic Cable, IEEE Transactions on Dielectrics and Electrical Insulation Vol. 12, No. 3; June 2005, pp. 487-495;

Qi Huang, George G. Karady, Baozhuang Shi, and Monty Tuominen, Numerical Simulation of Dry-band Arcing on the Surface of ADSS Fiber-optic Cable, IEEE Transactions on Dielectrics and Electrical Insulation, Vol. 12, No. 3; June 2005, pp. 496-503;

Cristian Militant, ADSS Cables Electrical Corrosion Tests, International Wire & Cable Symposium Proceedings 1999, pp. 614-620;

Optical Fiber Cables Near High Voltage Circuits, Corning Cable Systems Applications Engineering Note, AEN 32, Revision #5, 2002;

George G. Karady, Srinivasan Devarajan, Monty Tuominen, B. Han, Computer Simulation of Fiber-optic Cable Failures due to Dry-Band Arcing, 0-7803-5569-5/99 1999 IEEE, pp. 890-894; and George G. Karady, Johnny Madrid, Assessing Deterioration of ADSS Fiber Optic Cables Due to Corona Discharge, PSERC Publication 02-17, May 2002.

Additional background is provided in FIGS. 1-6.

FIG. 1 shows induced voltage distribution on clean dry all-dielectric self-supporting fiber optic cable 1. This is caused by the capacitive coupling of the power from the phase conductors 2 to the ADSS fiber optic cable 1. This charge is driven to near zero as the ADSS cable 2 approaches the tower structure 3 and grounded cable attachment hardware 4 on either side of the span. This is the fundamental mechanism that leads to the cable tracking mechanism.

FIG. 2 shows the induced voltage potential V (in kV) and the electric field E (in kV/cm) on the ADSS cable 1 near the tower structure 3. The potential and field are inversely proportional, as the voltage potential drops the electric field increases. The graph shows the values from the tower structure 3 (or earthed deadend) to the middle of a span between two tower structures.

FIG. 3 shows the voltage potential on the ADSS cable as the cable goes through the wet and dry cycles of precipitation. This diagram show an ADSS cable that is clean and uncontaminated, thus the cable surface resistance is uniform over the majority of the span. For example, the top line represents a cable that is dry. It could have a cable resistance of approximately $10^{14}$ $\Omega$/m. The bottom two lines represent cables that begin to get wet, and become more wet. They show the cable resistances dropping to approximately $10^{11}$ $\Omega$/m and then to $10^9$ $\Omega$/m and then $10^7$ $\Omega$/m. As conditions change, the cable resistances can cycle from higher resistances to lower resistances, and from lower resistances to higher resistances.

FIGS. 4A-4D show the voltage distribution on an ADSS fiber optic cable as the cable develops a localized area of contamination or non-uniform drying. The show the distribution of a cable from the tower structure to about 100 m away from the support structure. A dry band is formed and the resistance on the ADSS cable jacket is high. With current flowing over the jacket this dry band area will have a short period where the current flowing on the surface will scintillate or arc across the dry band or contaminates. This arc causes degradation to the jacket surface that eventually caused exposure of the cable strength elements and subsequent cable failure. FIG. 4A shows the voltage distribution for a dry cable, such as the top line in FIG. 3. FIG. 4B shows the voltage distribution for a completely wet cable. FIG. 4C shows the voltage distribution of a wet cable, such as in the bottom line of FIG. 3, with a cable resistance of approximately $10^7$ $\Omega$/m.

The cable also has a dry (or contaminated spot) approximately 30 meters from the tower structure with a cable resistance of approximately $10^9$ Ω/m. FIG. 4D shows that over time, the voltage potential at the dry spot can get worse, further damaging the cable. For example, as shown, the cable resistance at the 30 meter spot has increased to approximately $10^{12}$ Ω/m.

FIGS. 5A-5C show how the tracking etch starts the erosion process to damage the cable jacket. FIG. 5A shows moisture droplets on an ADSS cable. In this example, the cable is very wet there isn't an issue because the charge can continue to flow between the moisture droplets. However, in FIG. 5B, if the cable semi-wet, a tracking etch, or arc can occur if the droplets are further apart. This is shown by the lines on the cable. FIG. 5C shows that tracking etch lines that remain on cable after it has dried. This can create a preferred path for the charges that are built up on the cable.

FIG. 6 shows an ADSS cable that has started to experience the jacket erosion caused by the tracking mechanism.

An object of this invention is to develop cable that mitigates the deterioration of the outer protective jacket by the dry-band arc or tracking mechanism.

An object of this invention is to develop cable that mitigates the deterioration of the outer protective jacket by the dry-band arc or tracking mechanism that is less expensive to manufacture than cables with special jackets with proprietary compounds that provided a higher resistance to thermal and mechanical stresses caused by the tracking mechanism.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is a cable including an inner cable, an outer jacket surrounding the inner cable, and at least one semi-conducting tracking resistant material strip provided in the outer jacket.

In another embodiment of the invention, the cable further includes a plurality of semi-conducting tracking resistant material strips.

In another embodiment of the invention, the cable is a dielectric cable.

In another embodiment of the invention, the cable is an all-dielectric self-supporting cable.

In another embodiment of the invention, the cable includes a plurality of buffer tubes, and at least one of the buffer tubes includes at least one optical fiber.

BRIEF DESCRIPTION OF THE DRAWINGS

FIG. 3 shows the voltage potential on the ADSS cable as the cable goes through the wet and dry cycles of precipitation.

FIGS. 4A-4D show the voltage distribution on an ADSS fiber optic cable as the cable develops a localized area of contamination or non-uniform drying.

DETAILED DESCRIPTION

Figure 1:
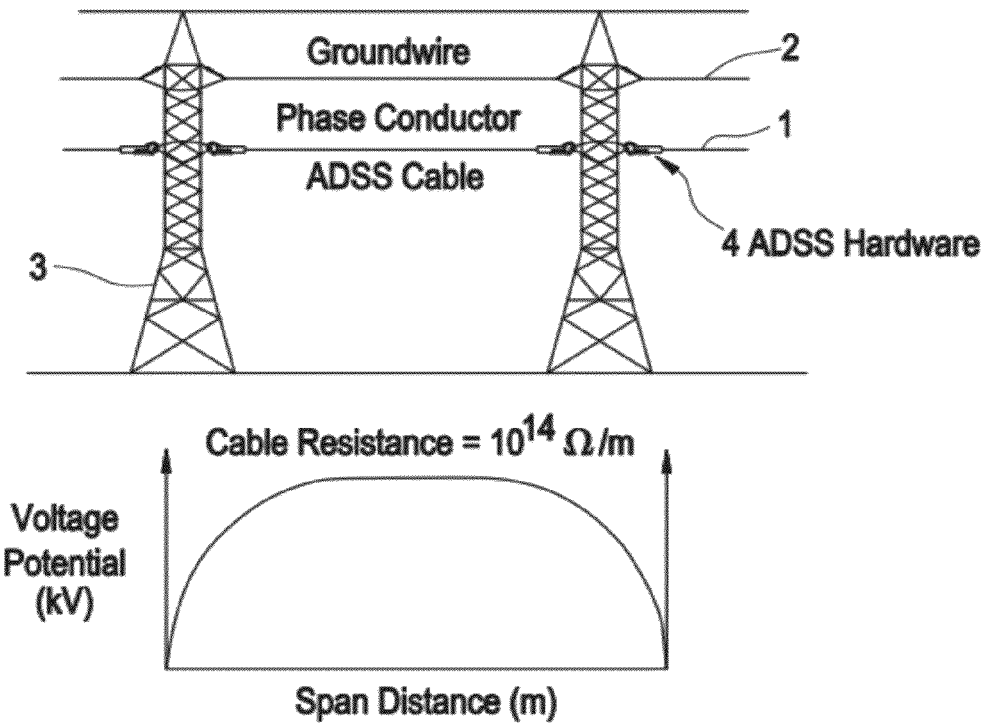
FIG. 1 shows induced voltage distribution on clean dry all-dielectric self-supporting fiber optic cable.
Figure 2:
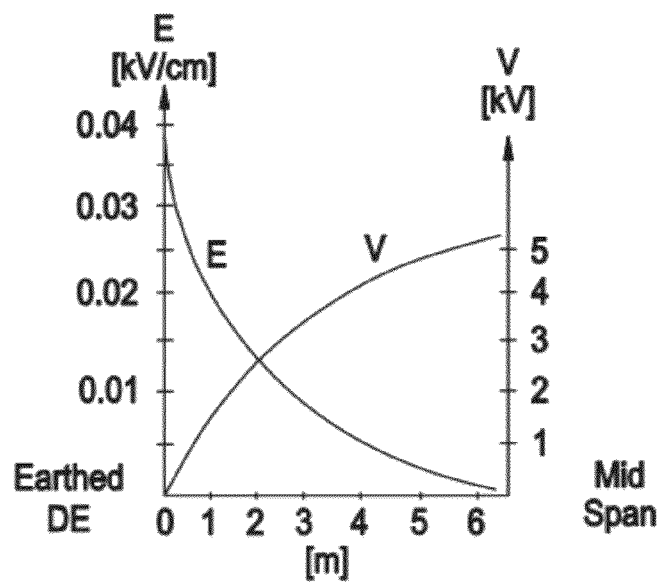
FIG. 2 shows the induced voltage potential V (in kV) and the electric field E (in kV/cm) on the ADSS cable near the tower structure.
Figure 5A:
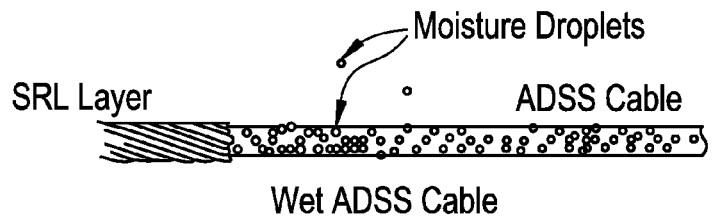
FIGS. 5A-5C show how the tracking etch starts the erosion process to damage the cable jacket.
Figure 5B:
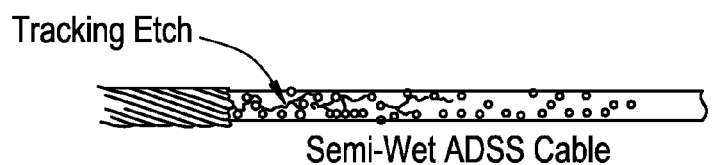
Figure 5C:
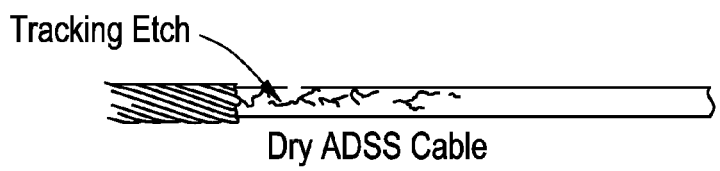
Figure 6:
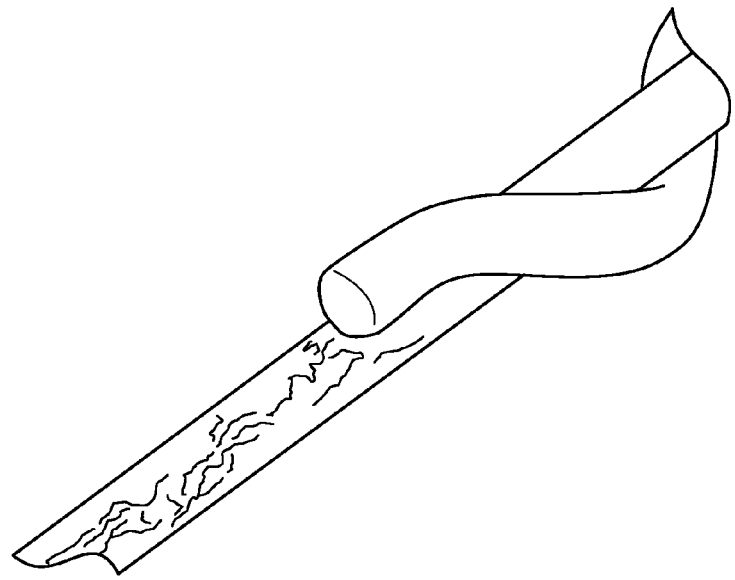
FIG. 6 shows an ADSS cable that has started to experience the jacket erosion caused by the tracking mechanism.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

The new technology to improve an ADSS cable's resistance to the tracking mechanism is based on co-extruding a longitudinal semi-conducting strip in the outer jacket of a material. See FIGS. 7 and 8. The longitudinal strip has material properties that are still considered dielectric, however, they be lower in overall resistance of the jacket material to allow leakage of current and subsequent electrical charge off of the ADSS jacket thus mitigating the tracking mechanism.

On embodiment of the cable includes a plurality of optical fibers 10 surrounding a core/mantle, such an FRP rod 11. In the particular embodiment, the optical fibers are in non-metallic, non-conductive buffer tubes 12.

An inner jacket 13 surrounds the plurality of optical fibers 10 to form an inner cable. The jacket can be made of polyethylene or polyolefin or organic thermoplastic polymer type material. In this particular embodiment, a Mylar layer 17 is wrapped around the buffer tubes 12 to provide decoupling between the buffer tubes 12 and inner jacket 13. However, a Mylar layer is not required. Strength elements 14, such as aramid, or another conventional synthetic material, surround the inner jacket 13. An outer jacket 15 surrounds the strength elements 14. The outer jacket 15 can be made of materials such as of polyethylene or a tracking resistant material. In this particular embodiment, a Mylar layer 17 is wrapped around the strength elements 14 to provide decoupling between the strength elements 14 and the outer jacket 15. However, a Mylar layer is not required.

A co-extruded semi-conducting tracking resistant material strip 16 is provided in the outer jacket 15. An example of such a tracking resistant material 16 is a highly filled polyolefin based material with semiconducting material such as magnesium hydroxide. However, the invention is not limited to this specific material. The co-extruded semi-conducting tracking resistant material 16 is created through conventional co-extruding methods that are well known in the art.

Figure 7:
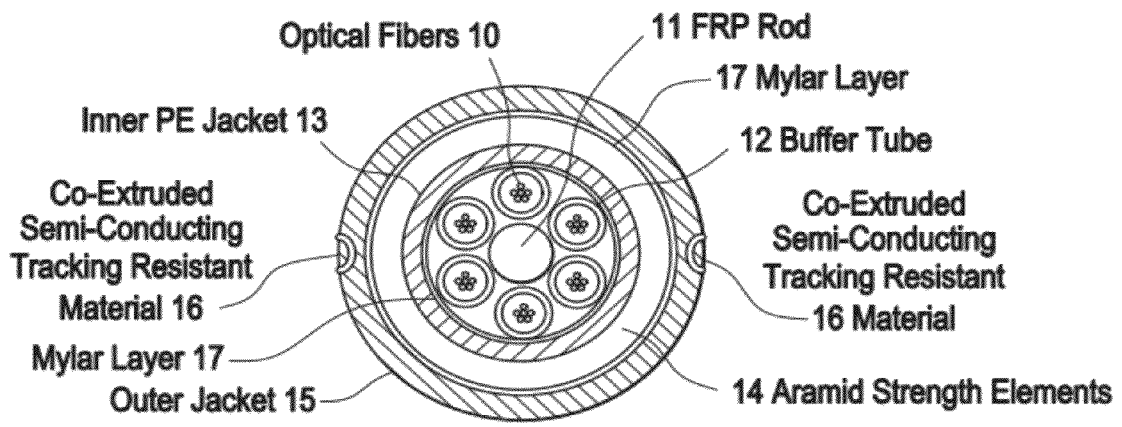
FIG. 7 shows a cross-sectional view of an embodiment of the invention.
Figure 8:
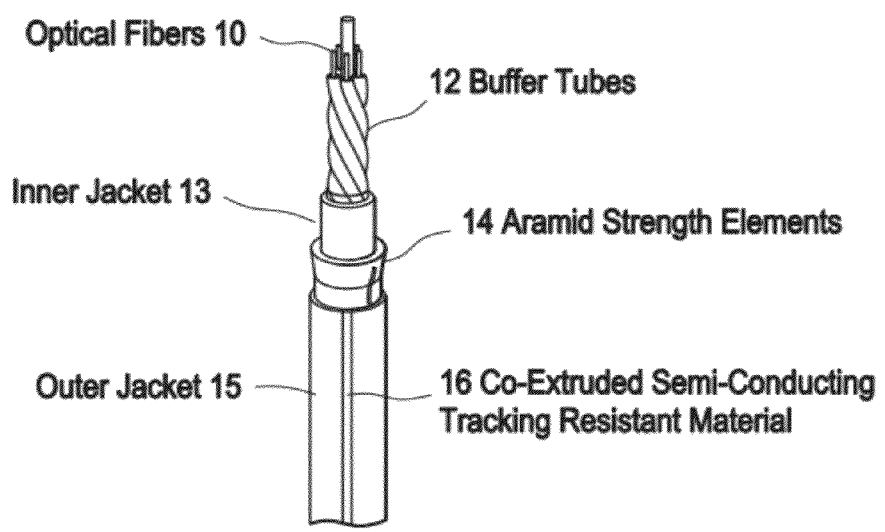
FIG. 8 shows a perspective view of an embodiment of the invention.

The embodiment shown in FIGS. 7 and 8 show two co-extruded semi-conducting tracking resistant material strips 16. However, the invention is not limited to two strips. Other embodiments could include just one strip, or a plurality of strips. In addition, in one embodiment, the strip is approximately 3 mm wide. However, other thicknesses could be provided, such as thicknesses that would cover almost the entire outer jacket 15, as long as they prevent or minimize the deterioration of the outer protective jacket by the dry-band arc or tracking mechanism.

One of the benefits of this technology is that rather than using expensive and complex proprietary jacket material for the outer ADSS cable jacket, a more traditional lower cost outer jacket material with the co-extruded longitudinal strip is used to achieve the same or better resistance to the electrical stress mechanism known as tracking or dry band arcing.

As mentioned above, although the exemplary embodiments described above are directed to ADSS cables, this is merely exemplary and the general inventive concept should not be limited thereto, and it could also apply to other dielectric cables, both with optical fibers and/or electrical wires, located near high voltage sources or other types of cables located near high voltage power sources.

What is claimed:

1. A cable comprising:
    an inner cable;
    an outer jacket surrounding said inner cable; and
    at least one semi-conducting tracking resistant material strip provided in said outer jacket,
    wherein said at least one semi-conducting tracking resistant material strip extends longitudinally along said outer jacket.
2. The cable of claim 1, wherein said at least one semi-conducting tracking resistant material strip is exposed on an outer surface of said outer jacket.
3. The cable of claim 1, wherein said at least one semi-conducting tracking resistant material strip does not protrude beyond said outer jacket in a radial direction of the cable.
4. The cable of claim 1, wherein said at least one semi-conducting tracking resistant material strip extends continuously along a longitudinal axis of the cable.
5. The cable of claim 1, said at least one semi-conducting tracking resistant material strip is recessed in a semi-circular recess in said outer jacket.
6. The cable of claim 1, further comprising a plurality of semi-conducting tracking resistant material strips.
7. The cable of claim 1, wherein said cable is a dielectric cable.
8. The cable of claim 7, wherein said cable is an all-dielectric self-supporting cable.
9. The cable of claim 1, wherein said inner cable comprises a plurality of buffer tubes, and wherein at least one of said buffer tubes comprises at least one optical fiber.
10. The cable of claim 7, further comprising a plurality of semi-conducting tracking resistant material strips.
11. The cable of claim 8, further comprising a plurality of semi-conducting tracking resistant material strips.
12. The cable of claim 9, further comprising a plurality of semi-conducting tracking resistant material strips.
13. The cable of claim 1,
    wherein said at least one semi-conducting tracking resistant material strip comprises magnesium hydroxide.

* * * * *